United States Patent

[11] 3,592,330

[72] Inventor Traver J. Smith
 San Jose, Calif.
[21] Appl. No. 801,080
[22] Filed Feb. 20, 1969
[45] Patented July 13, 1971
[73] Assignees Genevieve I. Hanscom
 Saratoga, Calif.;
 Genevieve I. Hanscom, Robert Magnuson,
 and Lois J. Thomson, Trustees of the Estate
 of Roy M. Magnuson,
 part interest to each

[54] ARTICLE-FEEDING SYSTEM AND METHOD
 6 Claims, 7 Drawing Figs.
[52] U.S. Cl. ................................................. 198/85,
 198/30
[51] Int. Cl. ................................................. B65g 37/00
[50] Field of Search ........................................ 198/219,
 30, 31—31 AC, 85

[56] References Cited
UNITED STATES PATENTS
| | | | |
|---|---|---|---|
| 1,028,411 | 6/1912 | Wieghard et al. | 198/219 X |
| 2,594,337 | 4/1952 | Noe | 214/1 C UX |
| 2,609,947 | 9/1952 | Couchman, Jr. et al. | 214/16 (B) |
| 2,728,443 | 12/1955 | Pike, Jr. et al. | 198/219 X |
| 3,145,825 | 8/1964 | Carter | 198/30 |

Primary Examiner—Gerald M. Forlenza
Assistant Examiner—Frank E. Werner
Attorney—Allen and Chromy ABSTRACT: The present feed mechanism and method is designed to handle small articles such as frozen foods and deliver a desired quantity of the particular articles such as grapes, cherries, pineapple segments and the like for filling into a container. The feed system employs a shuffle feed mechanism which is slanted or tilted toward one side so as to provide continuous rows of articles against a stop formed by a sidewall of the shuffle feed mechanism. An adjustable divider or baffle member divides each row of articles as discharged from the shuffle feed mechanism, directing one part as a count of articles into a hopper for filling into a container. The remainder or other part of the articles of each row are returned to the shuffle mechanism adjacent the sidewall or stop for refeeding as a part of the articles to be filled.

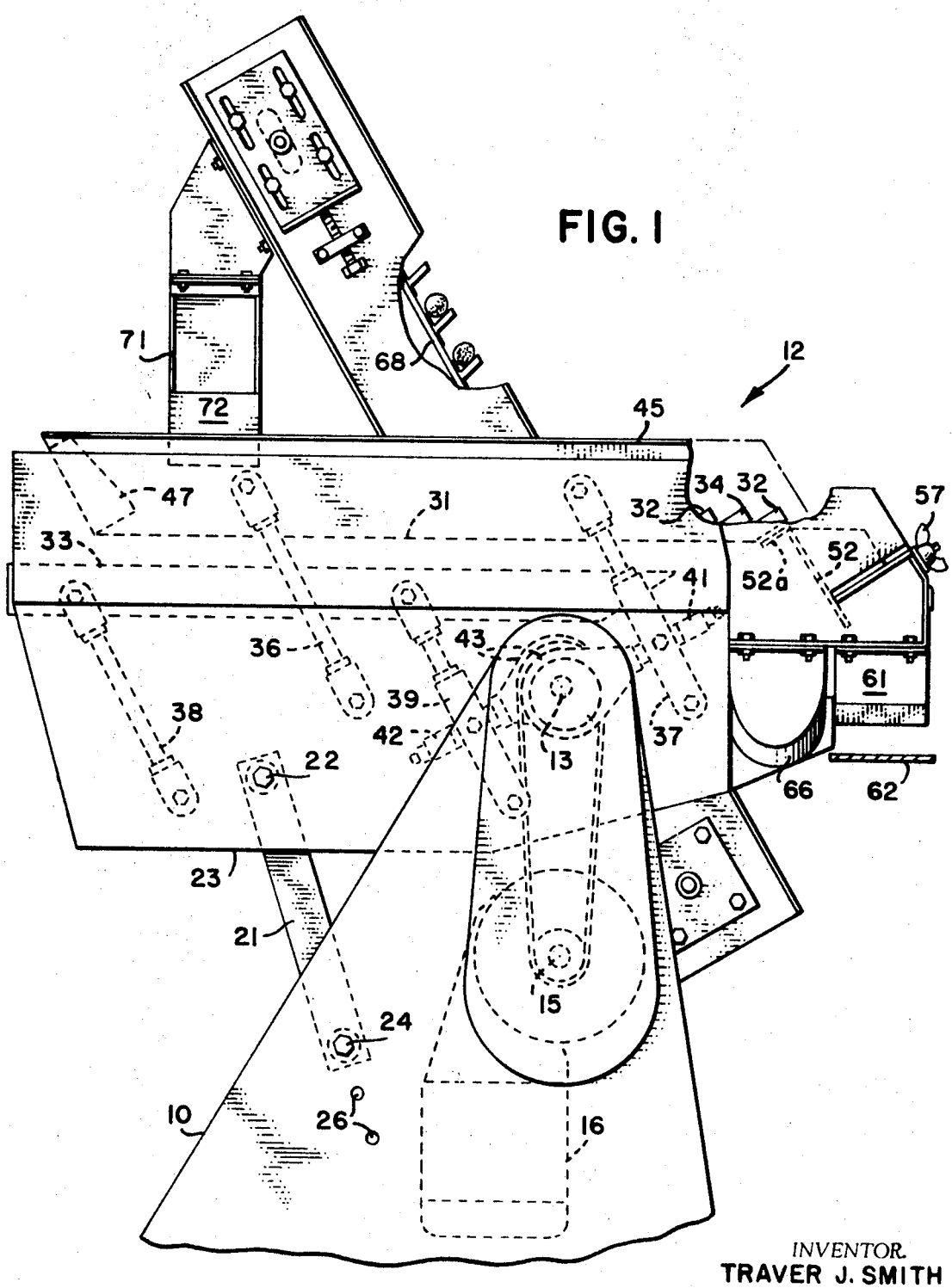

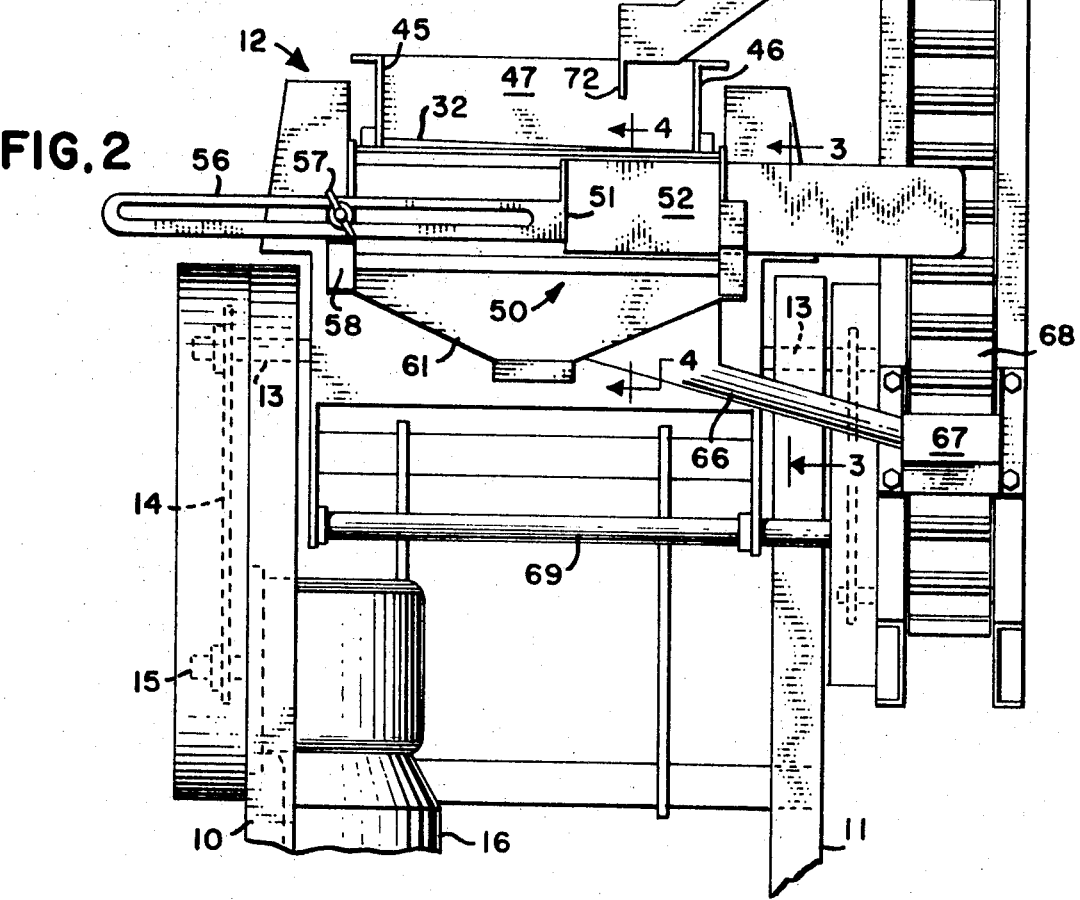

PATENTED JUL 13 1971

INVENTOR.
TRAVER J. SMITH

BY Allen and Chromy

ATTORNEYS

ARTICLE-FEEDING SYSTEM AND METHOD

DESCRIPTION OF INVENTION

The present invention relates to a feeding system and method for articles and is concerned more particularly with a feeding system wherein it is desired to package a counted number of articles. This feeding is done in the present invention by arranging the articles in rows from a common end stop, and feeding the rows in timed fashion to a discharge point and making a division of each row between a desired number of articles and the excess articles in the row which are recirculated back into the feed.

It is a general object of the invention therefor to provide an improved apparatus and method for feeding a counted and/or weighed number of articles.

A further object of the invention is to provide an apparatus and method for forming rows of articles and including a baffle member or divider which is adjusted with respect to a row of articles in accordance with the size and weight of the articles being fed, to feed a desired number of articles for placing in a container.

A further object of the invention is to provide a feeding system of the above character for handling frozen foods, such as frozen fruits or fruit segments in which return of the excess articles of each row to the feed mechanism is effected in a location to place the returned articles in one of the rows of articles being taken off for packaging so as to reduce the amount of time the frozen article is handled under thawing conditions.

The above and other objects of the invention are attained, as described in connection with a preferred embodiment of the invention, shown in the accompanying drawings, in which:

FIG. 1 is a side elevational view of the apparatus;

FIG. 2 is an end elevational view of the apparatus taken from the right-hand side of FIG. 1;

FIG. 3 is a sectional view of the apparatus taken as indicated by the line 3-3 in FIG. 2;

FIG. 4 is a sectional view similar to FIG. 3 but taken on the line 4-4 in FIG. 2;

Figure 5:
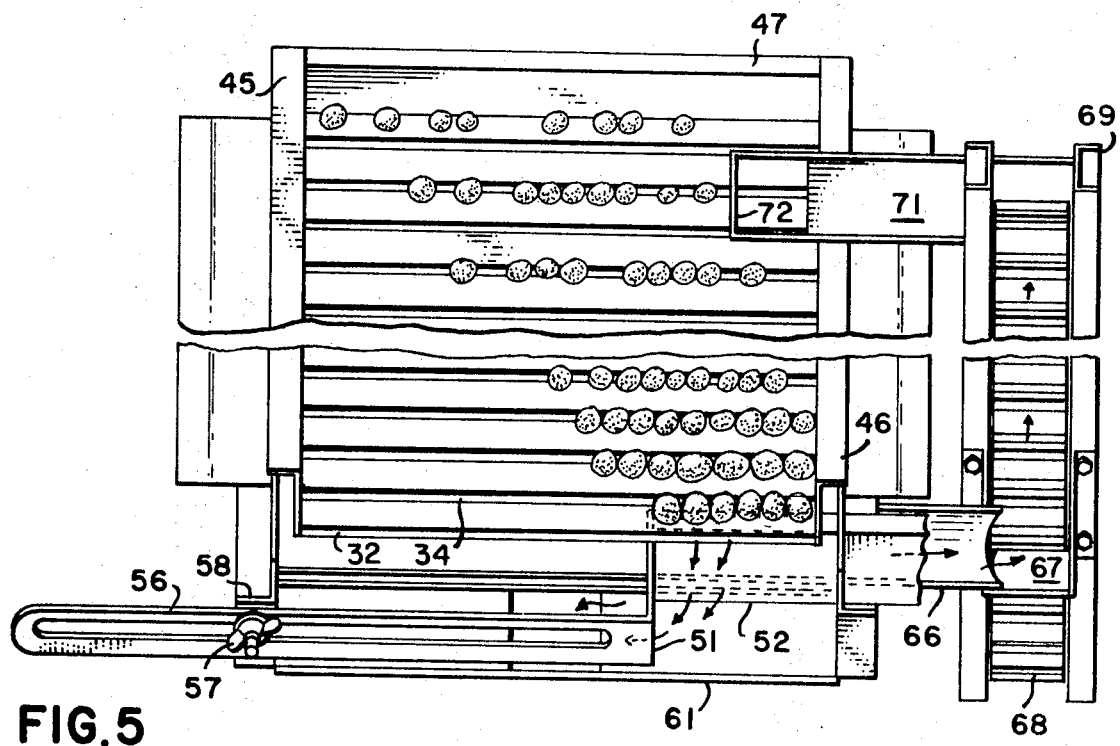
FIG. 5 is a plan view of the apparatus.
Figure 6:
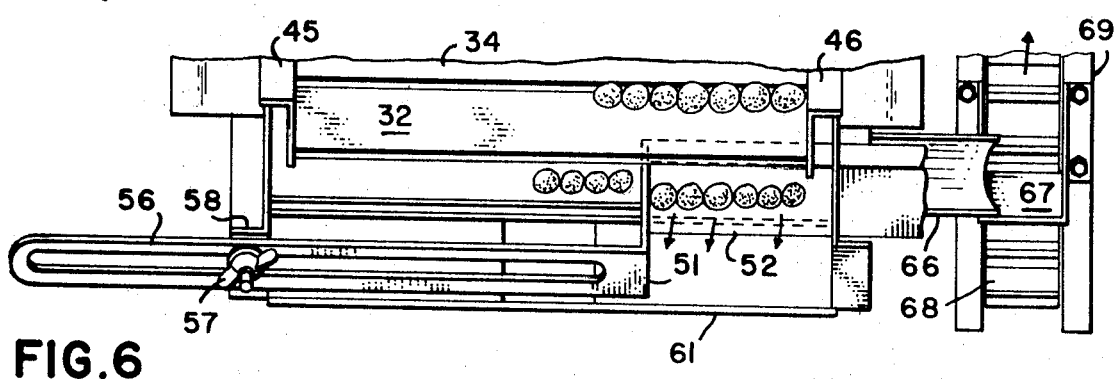
FIG. 6 is an operational view similar to FIG. 5 but illustrating a further phase of the operation.

This invention is concerned with a shuffle feed mechanism of the character shown in the U.S. Pat. to Magnuson No. 2,792,929 dated May 21, 1957 and Pike et al., No. 2,728,443 dated Dec. 27, 1955 to which reference is made for a complete disclosure of details not described herein.

Referring to the drawings, the apparatus includes a pair of frame standards 10 and 11 (FIGS. 1 and 2) in which a shuffle feed mechanism indicated generally as 12 is pivotally mounted by means of a cross shaft 13 at the top of the standards. This cross shaft 13 is the drive shaft of the machine and is connected by a chain and sprocket mechanism 14 to a drive shaft 15 of the variable speed electric motor 16. The position of the shuffle feed mechanism 12 in the frame standards 10 and 11 is controlled by connecting link 21 pivoted at 22 to a side frame member 23 of the shuffle feed mechanism and being adapted to be variably connected by a bolt 24 to one of a series of apertures 26 in the standard 10. Thus, the shuffle feed mechanism 12 is adjustably mounted for pivoting movement to control the angular position of the shuffle members during their feeding.

The shuffle feed mechanism comprises an upper shuffle feed frame 31 (FIG. 1) having a series of shuffle members 32 carried thereby and also a lower shuffle feed frame 33 having a series of shuffle members 34 carried thereby. The shuffle frame 31 is pivotally supported by two pair of parallel links 36 and 37, while the frame 33 is similarly supported by two pair of parallel links 38 and 39. The links 36, 37, 38 and 39 at each side are pivotally mounted at the lower ends on the adjacent side frame member 23 of the shuffle feed mechanism.

Preferably the links 39 and 37 at each side are connected by a cam follower arm 41 or 42, respectively, to drive cams 43 carried by the drive shaft 13. In this way the bed of shuffle members 32 are moved back and forth in a direction opposite to that of the bed of shuffle members 34 in the usual fashion, and will serve to arrange articles in rows and to deliver these articles over the end of the endmost shuffle feed member 32. The upper shuffle feed bed 31 is provided with respective wall structures 45 and 46 which is disposed at either side of the shuffle member 31 and has a rearward wall or ramp 47 by means of which articles can be fed onto the shuffle feed mechanism from any desired sort of conveyor. The support and drive for the two sets of shuffle feed members 32 and 34 are disclosed and claimed in the copending application of Louis P. LAZZARINI, Ser. No. 838,752, filed July 3, 1969 for Shuffle Feed Drive Arrangement.

Thus, the shuffle feed members 32 and 34 serve to advance the articles row by row and means are provided cooperating with the endmost shuffle feed member to divide the articles into two parts, one part being of a selected desired number and being the side toward which the articles tend to gravitate because of the tilted mounting of the shuffle feed mechanism, i.e. the right side of FIG. 5. Obviously, the same feeding action can be gotten by a skewed or slanted relation of the shuffle feed members to place that end of the shuffle feed member at the right of FIG. 5 in rearmost position. The division point in FIG. 5 is provided by a vertical wall 51 which on one side is connected to an angle-shaped extension 52 slidably supported in an angle-shaped aperture 53 (FIG. 3) in the adjacent wall 46, and at the opposite side the wall or divider 51 has a slotted extension 56 FIGS. 2 and 5) which is secured by means of a wing nut 57 to a wall 58 of the shuffle feed frame structure. As seen in FIGS. 1 and 4 the ramp portion 52 is connected at its top edge with a rearward and downward extending wall portion 52a which underlies and is parallel to the endmost shuffle feed member 32 so as to prevent any undesired discharge of articles rearwardly of the ramp or wall 52. As most clearly seen in FIG. 5 this wall portion 52a terminates at the divider wall 51 so that to the left of this divider wall as viewed in FIG. 5 a normal discharge of articles in a row will occur.

It will be seen that by selectively positioning the divider baffle member 50, the divider wall 51 can be placed between two adjacent articles of a row with the desired number on the right-hand side in FIG. 5 so that these two adjacent articles will fall on opposite sides of the divider wall 51. The articles to the right of the baffle 51 are rolled down over the inclined ramp portion 52 (FIGS. 2 and 4) and are dropped into a feed hopper 61 (FIGS. 1 and 2) which may be associated with a container on a suitable transverse conveyor 62 indicated schematically in FIG. 1. The remaining articles of a row, or the other part of the articles, are discharged over the end of the shuffle feed member 34 and fall directly into a chute 66 extending over a feed hopper 67 leading to a conventional elevating conveyor 68 suitably mounted on the frame 11 by means of the shaft 13 and a transverse pipe 69. The upper discharge end of this conveyor 68 (FIGS. 2 and 5) discharges articles into a feed chute 71, which lies over the feed end of the shuffle feed mechanism close to the wall 46 so that these articles are among the first fed out in the succeeding operations. Preferably, a wall 72 prevents overrunning of the articles and insures their dropping into the desired portion of the shuffle feed mechanism.

Figure 7:
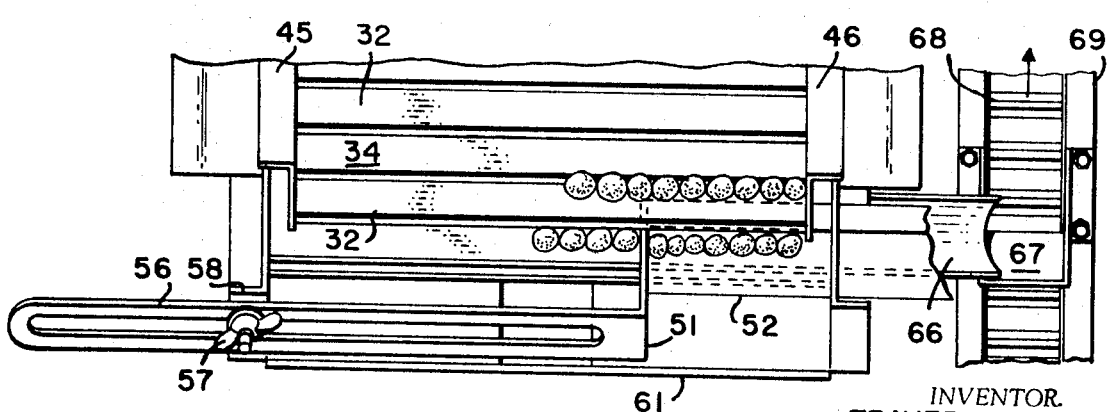
FIG. 7 is a view similar to FIG. 5 but showing the instance where a smaller number of articles can be fed in the same space as the six articles shown in FIG. 4.

The shuffle feed mechanism described is especially useful in the handling of natural articles, such as cherries, grapes, etc. and particularly articles which are frozen before packaging. With these articles there are two requirements in the packing operation as to quantity. One is a minimum number of articles in each package and the second is a minimum weight of the article in each package. Consequently, in some cases in a field run of the articles, the minimum can be met by adjusting the divider 51 to place, for example, six of the articles in a package from each row. At a subsequent time in the packing operation the articles may have become smaller so that seven articles will be required to obtain the desired minimum weight as illustrated for example in FIG. 7. The adjustment to change the number of articles fed by the shuffle feed onto the ramp 52 and into the hopper 61 can be easily and quickly made.

In general the frozen articles will be fed onto or placed onto the upper portion of the shuffle feed mechanism as shown in FIG. 5 and will be arranged in rows by the action of the shuffle feed mechanism. The rows have a common stop in the form of the wall 46 to which the articles move by virtue of the inclination of the shuffle feed mechanism as seen in FIG. 2 to make the shuffle members lowest at this wall 46. As seen in FIG. 5, as a row of articles is fed from the endmost valley in the shuffle feed the rows will be divided by the divider wall 51 to place six articles onto the ramp 52 for feeding into a package, and the remaining articles of the row onto the chute 56 for feeding to the elevating conveyor 68. The elevating conveyor through the ramp 71 places these articles closely adjacent the wall 46, the stop wall 72 serving to insure the placing the articles closely adjacent the wall 46 so when the next row is fed out the bypassed articles will feed into that part of the articles being packaged.

In the case of frozen articles this insures a minimum exposure to thawing conditions. In the case of articles subject to oxidation and browning it exposes minimum exposure to the atmosphere.

While I have shown and described a preferred embodiment of the invention it will be apparent to those skilled in the art to which it relates that the invention is capable of variation and modification from the form shown so that the scope thereof should be limited only by the proper scope of the claims appended hereto.

I claim:

1. In an article feed system, means for arranging articles in successive separated rows transverse to the direction of feed and for delivering articles row by row at a discharge location, means for dividing each row into a plurality of separate parts or groups including adjustable means for selecting the number of articles in the one of said parts, and means directing the separated parts as discharged from said location to separate discharge paths.

2. In an article feed system as recited in claim 1, including a return conveyor for receiving another of said parts and returning the articles thereon to said arranging and delivering means in the region containing articles for said one part of said articles.

3. In an article feed system as recited in claim 1, in which said arranging and delivering means comprises a shuffle feed mechanism having shuffle feed members for periodically discharging rows of articles over the discharge end thereof, and in which said dividing means comprises a divider member mounted for movement across the discharge end of said shuffle feed to a selected location, and in which said number selecting means includes a dividing wall of said divider member for separating said articles into two parts.

4. In an article feed system as recited in claim 3, including a return conveyor for receiving the other of said parts and returning it to said shuffle feed mechanism in the region containing articles for said one part of said articles.

5. In an article feed system as recited in claim 3, in which said shuffle feed mechanism has respective side walls between which the shuffle feed members move back and forth in parallel relation to said sidewalls, and said divider member comprises a vertical wall disposed at the discharge end of said shuffle feed mechanism and extending in the direction of flow of articles over said shuffle feed mechanism, an angle-shaped extension of said vertical wall slidably mounted in one of the side walls of said shuffle feed and comprising a ramp portion for receiving a feed of articles from the shuffle feed mechanism and delivering them at a location spaced from the discharge end of said shuffle feed mechanism and including a wall portion attached to the top of the ramp portion and underlying and parallel to the endmost shuffle feed member, and a slotted extension connected to said vertical wall and extending therefrom in a direction opposite to said ramp portion and being detachably secured to a wall portion of the shuffle feed mechanism.

6. The method of feeding a desired number of frozen articles into each of a series of containers, which comprises arranging the articles in separated successive transverse rows, advancing the articles as rows and as each row is discharged splitting the row into two parts, one part containing the desired number, and recirculating the other part and directing it to a region of the feeding wherein it will be incorporated into the parts of rows of the desired number.